US009100968B2

(12) United States Patent
Rivingston et al.

(10) Patent No.: US 9,100,968 B2
(45) Date of Patent: Aug. 4, 2015

(54) METHOD AND SYSTEM FOR DIGITAL CANCELLATION SCHEME WITH MULTI-BEAM

(71) Applicant: Magnolia Broadband Inc., Englewood, NJ (US)

(72) Inventors: Thorp Rivingston, Long Branch, NJ (US); Haim Harel, New York, NY (US); Kenneth Kludt, San Jose, CA (US); Phil F. Chen, Denville, NJ (US); Stuart S. Jeffery, Los Altos, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/273,866

(22) Filed: May 9, 2014

(65) Prior Publication Data

US 2014/0334312 A1 Nov. 13, 2014

Related U.S. Application Data

(60) Provisional application No. 61/821,510, filed on May 9, 2013.

(51) Int. Cl.
*H04W 74/08* (2009.01)
*H04W 16/14* (2009.01)
*H04W 24/08* (2009.01)

(52) U.S. Cl.
CPC .......... *H04W 74/0816* (2013.01); *H04W 16/14* (2013.01); *H04W 24/08* (2013.01); *Y02B 60/50* (2013.01)

(58) Field of Classification Search
USPC ................. 370/200–241, 252–338, 389–395; 375/260–267, 347–349
See application file for complete search history.

(56) References Cited

U.S. PATENT DOCUMENTS 4,044,359 A 8/1977 Applebaum et al.
4,079,318 A 3/1978 Kinoshita
(Continued)

FOREIGN PATENT DOCUMENTS

EP 1 189 303 3/2002
EP 1 867 177 5/2010
(Continued)

OTHER PUBLICATIONS

Notice of Allowance issued by the United States Patent and Trademark Office for U.S. Appl. No. 14/087,376 dated May 9, 2014.
(Continued)

*Primary Examiner* — Man Phan
(74) *Attorney, Agent, or Firm* — Pearl Cohen Zedek Latzer Baratz LLP

(57) ABSTRACT

A method and system may include a plurality of collocated access points (APs), each coupled to, and operating independently with, a respective set of antennas, wherein the antennas are directional and oriented to create beams that cover different directions, for dividing a coverage of the APs into a plurality of subsectors, wherein the antennas further comprise transmit antennas and receive antennas separated from each other, wherein the APs operate with a limited number of channels, wherein two or more of the subsectors share a common channel, wherein the APs are configured to initiate a transmission by employing collision sense multiple access/collision avoidance (CSMA/CA), wherein the antennas are configured to enable simultaneous operation of each of the subsectors without impairing operation of the others, and wherein a radio frequency (RF) energy reception between the transmit antennas and the receive antennas is configured to prevent independent subsector operation because of the CSMA/CA.

11 Claims, 6 Drawing Sheets

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,094,165 A | 7/2000 | Smith | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 | 11/2003 | Kuwahara et al. | |
| 6,697,622 B1 | 2/2004 | Ishikawa et al. | |
| 6,697,633 B1 | 2/2004 | Dogan et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,934,541 B2 | 8/2005 | Miyatani | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 | 12/2006 | Liu et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 * | 6/2008 | Haddad et al. | 370/338 |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 * | 3/2009 | Li | 370/269 |
| 7,606,528 B2 | 10/2009 | Mesecher | |
| 7,634,015 B2 * | 12/2009 | Waxman | 375/260 |
| 7,646,744 B2 * | 1/2010 | Li | 370/328 |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 | 1/2011 | Han et al. | |
| 7,881,401 B2 | 2/2011 | Kraut et al. | |
| 7,898,478 B2 | 3/2011 | Niu et al. | |
| 7,904,086 B2 | 3/2011 | Kundu et al. | |
| 7,904,106 B2 | 3/2011 | Han et al. | |
| 7,933,255 B2 * | 4/2011 | Li | 370/339 |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,111,782 B2 | 2/2012 | Kim et al. | |
| 8,115,679 B2 | 2/2012 | Falk | |
| 8,155,613 B2 | 4/2012 | Kent et al. | |
| 8,194,602 B2 | 6/2012 | Van Rensburg et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 | 8/2013 | Khojastepour | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 | 10/2013 | Jiang et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 | 12/2013 | Fujimoto | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 | 3/2014 | Naguib | |
| 8,744,511 B2 | 6/2014 | Jones et al. | |
| 8,754,810 B2 | 6/2014 | Guo et al. | |
| 8,767,862 B2 | 7/2014 | Abreu et al. | |
| 8,780,743 B2 * | 7/2014 | Sombrutzki et al. | 370/252 |
| 8,797,969 B1 | 8/2014 | Harel et al. | |
| 8,891,598 B1 | 11/2014 | Wang et al. | |
| 8,942,134 B1 | 1/2015 | Kludt et al. | |
| 8,976,845 B2 | 3/2015 | O'Keeffe et al. | |
| 9,035,828 B2 | 5/2015 | O'Keeffe et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 * | 10/2003 | Sugar et al. | 455/550.1 |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0098605 A1 * | 5/2006 | Li | 370/338 |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |

(56) References Cited

U.S. PATENT DOCUMENTS

| | | |
|---|---|---|
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1* | 10/2008 | Mushkin et al. ............... 370/338 |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |

(56) References Cited

U.S. PATENT DOCUMENTS

| | | | |
|---|---|---|---|
| 2013/0252621 | A1 | 9/2013 | Dimou et al. |
| 2013/0272437 | A1 | 10/2013 | Eidson et al. |
| 2013/0301551 | A1 | 11/2013 | Ghosh et al. |
| 2013/0331136 | A1 | 12/2013 | Yang et al. |
| 2013/0343369 | A1 | 12/2013 | Yamaura |
| 2014/0010089 | A1 | 1/2014 | Cai et al. |
| 2014/0010211 | A1 | 1/2014 | Asterjadhi et al. |
| 2014/0029433 | A1 | 1/2014 | Wentink |
| 2014/0071873 | A1 | 3/2014 | Wang et al. |
| 2014/0086077 | A1 | 3/2014 | Safavi |
| 2014/0086081 | A1 | 3/2014 | Mack et al. |
| 2014/0098681 | A1 | 4/2014 | Stager et al. |
| 2014/0119288 | A1 | 5/2014 | Zhu et al. |
| 2014/0185501 | A1 | 7/2014 | Park et al. |
| 2014/0185535 | A1 | 7/2014 | Park et al. |
| 2014/0192820 | A1 | 7/2014 | Azizi et al. |
| 2014/0204821 | A1 | 7/2014 | Seok et al. |
| 2014/0241182 | A1 | 8/2014 | Smadi |
| 2014/0242914 | A1 | 8/2014 | Monroe |
| 2014/0307653 | A1 | 10/2014 | Liu et al. |
| 2015/0016438 | A1 | 1/2015 | Harel et al. |
| 2015/0085777 | A1 | 3/2015 | Seok |
| 2015/0139212 | A1 | 5/2015 | Wang et al. |

FOREIGN PATENT DOCUMENTS

| | | |
|---|---|---|
| EP | 2 234 355 | 9/2010 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.

(56) References Cited

OTHER PUBLICATIONS

Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for PCT Application No. PCT/US2014/065958 mailed Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT Application No. PCT/US2014/064185 mailed Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao Lu et al., "A Distributed Adaptive GSC Beamformer over Coordinated Antenna Arrays Network for Interference Mitigation", Asilomar Conference on Signals, Systems and Computers. Conference Record, IEEE Computer Society, US, Nov. 4, 2012, pp. 237-242.
International Search Report and Written Opinion for PCT Application No. PCT/US2014/065635 mailed Feb. 13, 2015.
Notice of Allowance issued by the United States Patent and Trademark Office for U.S. Appl. No. 14/171,736 dated Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.

* cited by examiner

METHOD AND SYSTEM FOR DIGITAL CANCELLATION SCHEME WITH MULTI-BEAM

CROSS-REFERENCE TO RELATED APPLICATIONS

This application claims benefit from U.S. provisional patent application Ser. No. 61/821,510 filed on May 9, 2013, which is incorporated herein by reference in its entirety.

FIELD OF THE INVENTION

The present invention relates generally to wireless communication system, and more specifically, to digital cancellation scheme with multi-beam in such systems.

BACKGROUND OF THE INVENTION

Prior to setting forth the background of the invention, it may be helpful to set forth definitions of certain terms that will be used hereinafter.

The term "Wi-Fi" as used herein is defined as any wireless local area network (WLAN) products that are based on the Institute of Electrical and Electronics Engineers (IEEE) 802.11 standards.

The term "Access Point" or "AP" as used herein is defined as a device that allows wireless devices (also known as User Equipment or "UE") to connect to a wired network using Wi-Fi, or related standards. The AP usually connects to a router (via a wired network) as a standalone device, but it can also be an integral component of the router itself.

The term "client" as used herein is defined as any device that has wireless communication capabilities, specifically, the IEEE 802.11 standards. A client may be for example a smart telephone, a laptop, a tablet or a personal computer (PC).

The term "node" as used herein is defined as general name for both IEEE 802.11 AP and IEEE 802.11 STA.

The term "CSMA/CA" stands for Carrier-Sense-Multiple-Access/Collision-Avoidance, representing a requirement to listen before transmitting in a multi-node wireless system that shares a common channel on the basis of first-come-first-served.

The notation "SINR" stands for Signal-to-Noise and Interference.

The term "time division duplex" (TDD) as used herein is referred to in general for systems using the same frequency spectrum for methods of communications in a time division manner such as Wi-Fi systems.

While Worldwide Interoperability for Microwave Access (WiMAX) and Long Term Evolution (LTE) multi-channel Time-Domain-Duplex (TDD) base stations typically synchronize transmitter/receiver time interval amongst themselves, in order to avoid self-jamming, the Wi-Fi 802.11 protocol does not normally lend itself to such synchronization, since it is a contention based, Carrier Sense Multiple Access (CSMA) based protocol that practically requires independent transmitter/receiver switching for each channel.

Similarly, Wi-Fi clients will avoid transmitting over a channel that is not completely silent, thus allowing even the faintest of signals coming from co-channel neighboring APs and clients, to interfere with timely acknowledgements, generating unjustified retransmissions, which significantly reduce efficiency and effective capacity.

All of the above has therefore been dependent on significant isolation between Wi-Fi cells, a condition that suits indoors applications, where walls attenuation plays a positive role.

Recently however, Wi-Fi outdoors deployments have become a new trend, introducing new challenges in frequency reuse and capacity.

SUMMARY OF THE INVENTION

Some embodiments of the present invention provide a method that enables virtually co-located, co-channel Wi-Fi Access Points (APs) to perform with reduced inter-dependency, by separating transmitter and receiver signals.

Other embodiments of the present invention provide a method that enables the implementation of a system that facilitates the implementation of Multi-User (MU) multiple input multiple outputs (MIMO) architecture for Wi-Fi protocol 802.11 b, g, a, c, n, and its future derivatives.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

DETAILED DESCRIPTION OF THE INVENTION

Figure 1:
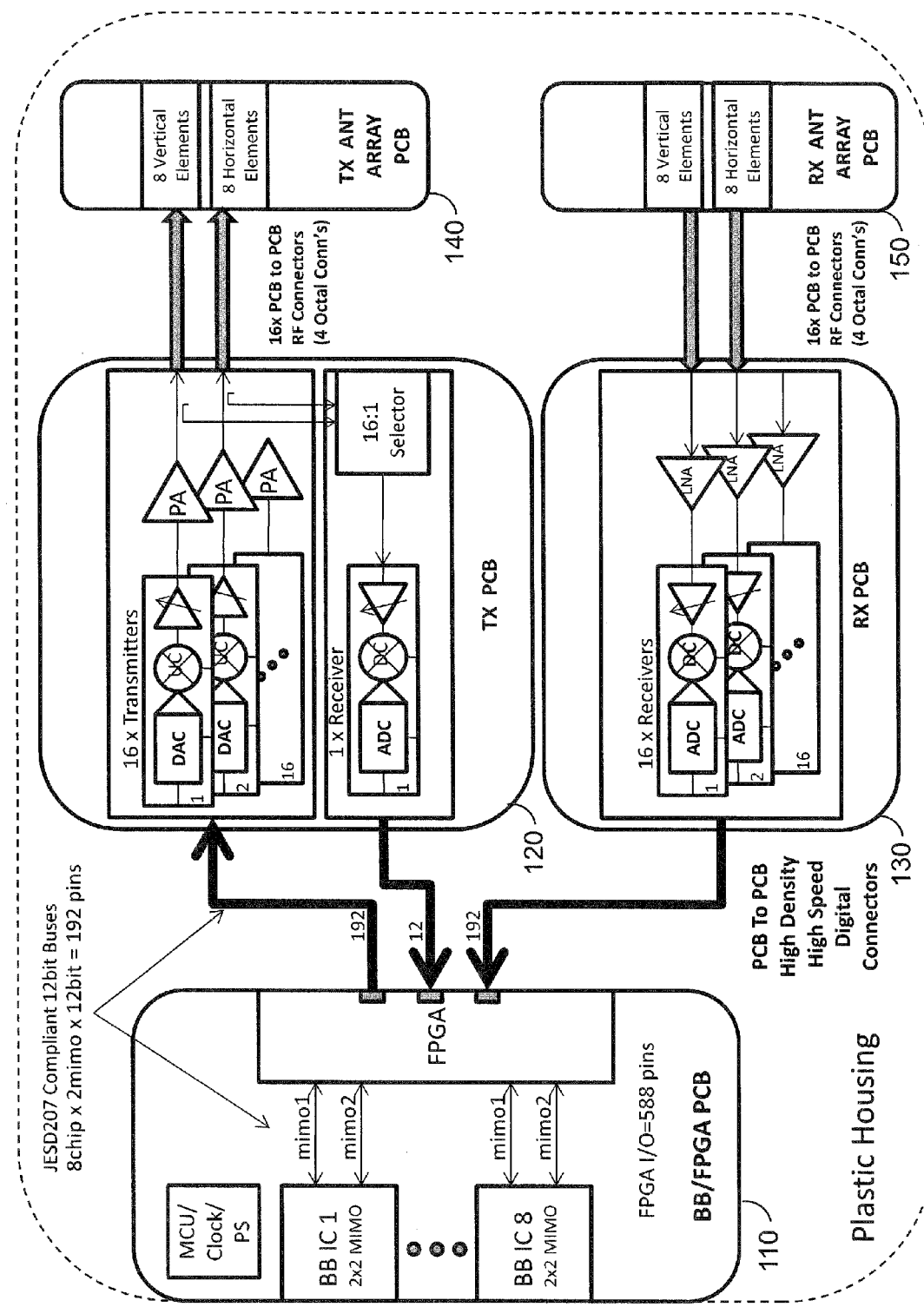
FIG. 1 is a block diagram illustrating a digital beamformer with digital cancellation in accordance with some embodiments of the present invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The distributed nature of CSMA protocols and 802.11 Wi-Fi in particular, generates little central control and limited predictability of time slices allocated to the AP and its various clients for transmissions. Unlike other wireless protocols like Global System for Mobile communication (GSM), Code Division multiple Access (CDMA), Long Term Evolution (LTE) and the like, the Wi-Fi protocol follows Ethernet landline rules, where contention may either does or does not exist, e.g. weak contention or strong one are treated similarly with a retreat, by Wi-Fi radios who share the channel (while cellular transmission will normally take place regardless of interference and be successful if SINR is sufficient).

For comparison, TDD Multi-User Cellular protocol base stations can switch simultaneously between Transmission and Reception, due to their full control on who does what and when. A cluster of Wi-Fi APs feeding similar co-located set of beams, will each switch between receive and transmit independently, jamming each other on many occasions. While the former is capable of reusing the spectrum up to N times, where N is the number of non-overlapping beams created by the base station, the former effort to carry N independent data streams will result in excessive retransmissions caused by jammed acknowledgments, rendering overall capacity to be equal or lower than serving the same group of clients with a single AP.

Embodiment of the present invention describe a method of clustering Wi-Fi multiple concurrent APs operating independently using legacy Physical (PHY) and Media Access Control (MAC) 802.11 protocol, using digital cancellation scheme with multi-beam.

In order to allow for a one AP's receiver to be oblivious of another one transmitting close by on frequency channel, the isolation required—assuming Effective Isotropic Radiated Power (EIRP) of +23 dBm should be brought down to noise level of some −90 dBm=113 dB.

It should be noted that when activating more than one co-channel over same antenna array, the summation of their power is limited to the ceiling (in one example to +23 dBm). For example, 4 such co-channel APs will be using in such a case up to 17 dB each. While specific amounts, dimensions and numbers of modules are provided herein, other numbers may be used with different embodiments of the invention.

FIG. 1 shows a diagram of an exemplary, non-limiting digital beam former with digital cancellation. The system may include five functional modules, each possibly on its own Printed Circuit Board (PCB). The modules may include a processor such as a baseband Field Programmable Gated Array (FPGA) PCB 110, transmit PCB 120, transmit antenna array 140, receive PCB 130, and receive antenna array 150. The baseband FPGA PCB 110 may be or include a plurality of baseband processors and a programmable FPGA processor and is configured to perform the functions of master controller, access point baseband, digital beam forming and cancellation in the FPGA. The transmit PCB 120 performs the functions of up conversion to RF, power amplification and sampling of the amplified RF signal. The receive PCB 130 performs the functions of RF low noise amplification, and down conversion to baseband analog. The transmit antenna array PCB performs 140 the function of transmit antenna array elements to create the transmit beams. The receive antenna array PCB 150 performs the function of receive antenna array elements to create the receive beams. Processors such as a baseband Field Programmable Gated Array (FPGA) PCB 110 or their functionality may be, or may be implemented, for example by a general purpose processor configured to carry out embodiments of the invention by executing software or code.

The transmit operation and signal flow in a non-limiting example may be as follows. Each of eight access point baseband chips (BB IC 1 to BB IC 8) generates two JESD207 compliant (or similar) buses for up-conversion to RF. These buses are bidirectional and contain both Imagery (I) and Quadrature (Q) signals. They are normally used for connecting the baseband chip directly to the Radio Frequency Integrated Circuit (RFIC), but the design of one embodiment uses an FPGA in between. The digital bus is then passed to the FPGA which will apply signal processing to achieve cancellation of residual transmit signal that occurs in the receive path due to limited transmit to receive antenna isolation. The FPGA will also process the signals to create the multiple antenna beams. The processed transmit signal is then passed to the transmit PCB 120 using the JESD207 compliant bus. In the transmit PCB, the digital signals are converted to analog and up converted to RF by the transmitter chip, and then amplified by RF power amplifiers. The RF signal at the output of the power amplifier is the sampled using a coupler and 16:1 RF selector switch. This signal will be down converted in the transmit PCB and passed as a JESD207 compliant bus to the BB/FPGA PCB for use in the cancellation process. The main RF signals at the outputs of the power amps are passed to the transmit antenna array PCB 120 using for example 16 coax connections. Within the transmit antenna array PCB the signal is routed to the appropriate antenna element to create the transmit beam. As with other items described herein, different numbers of connections, specific chips or modules, antennas, signals, etc., may be used in different embodiments of the present invention.

The receive operation and signal flow is for example as follows. RF signals are received at the antenna elements the receive antenna array PCB. These signals are passed to the receive PCB 230 using 16 coax connections. In the receive PCB, the signals are amplified, down-converted, and digitized to 16 JESD207 buses by the receiver chip. These buses are passed to the FPGA in the baseband FPGA PCB 110. In the FPGA these receive signals are digitally processed to create the receive beams and cancel any residual transmit signal component that is due to the limited transmit to receive antenna isolation by means of combining with the sampled digital transmit signals using a Finite Impulse Response (FIR) filter. The filter may be for example software executed by for example a baseband processor as described herein. After processing the 16 receive signals, the FPGA passes them to the baseband chips (BB IC1 to BB IC8) using a JESD207 bus.

According to some embodiments of the present invention the plurality of collocated access points (APs), shown in FIG. 1 as the entire block diagram are each coupled to, and operating independently with, a respective set of antennas 140 and 150, wherein the antennas are directional and oriented to create beams that cover different directions, for dividing a coverage of the APs into a plurality of subsectors, wherein the antennas further include transmit antennas 140 and receive antennas 150 separated from each other, wherein the APs operate with a limited number of channels (e.g., less than the number of collocated APs), wherein two or more of the subsectors share a common channel, wherein the APs are configured to initiate a transmission by employing collision sense multiple access/collision avoidance (CSMA/CA), wherein the antennas are configured to enable simultaneous operation of each of the subsectors without impairing operation of the others, and wherein a radio frequency (RF) energy reception between the transmit antennas and the receive antennas is configured to prevent independent subsector operation for example due to the CSMA/CA (serving as an inherent conflict avoidance scheme).

According to some embodiments of the present invention, the limited number of channels comply with IEEE 802.11 standards.

According to some embodiments of the present invention, the at least one of the processors in baseband/FPGA 110 may be configured to sample the RF signal being radiated by each antenna for each of the APs.

According to some embodiments of the present invention the method further comprises an analog to digital converter configured to convert the received signals into digital signals.

According to some embodiments of the present invention, the received transmitted RF energy is reduced by combining the received transmitted RF energy with the sampled digital signals, to allow simultaneous operation of the APs.

According to some embodiments of the present invention, the combining of signals is carried out by applying a finite impulse response (FIR) filter.

According to some embodiments of the present invention, the antennas are implemented as a multi-beam antenna array.

Figure 2:
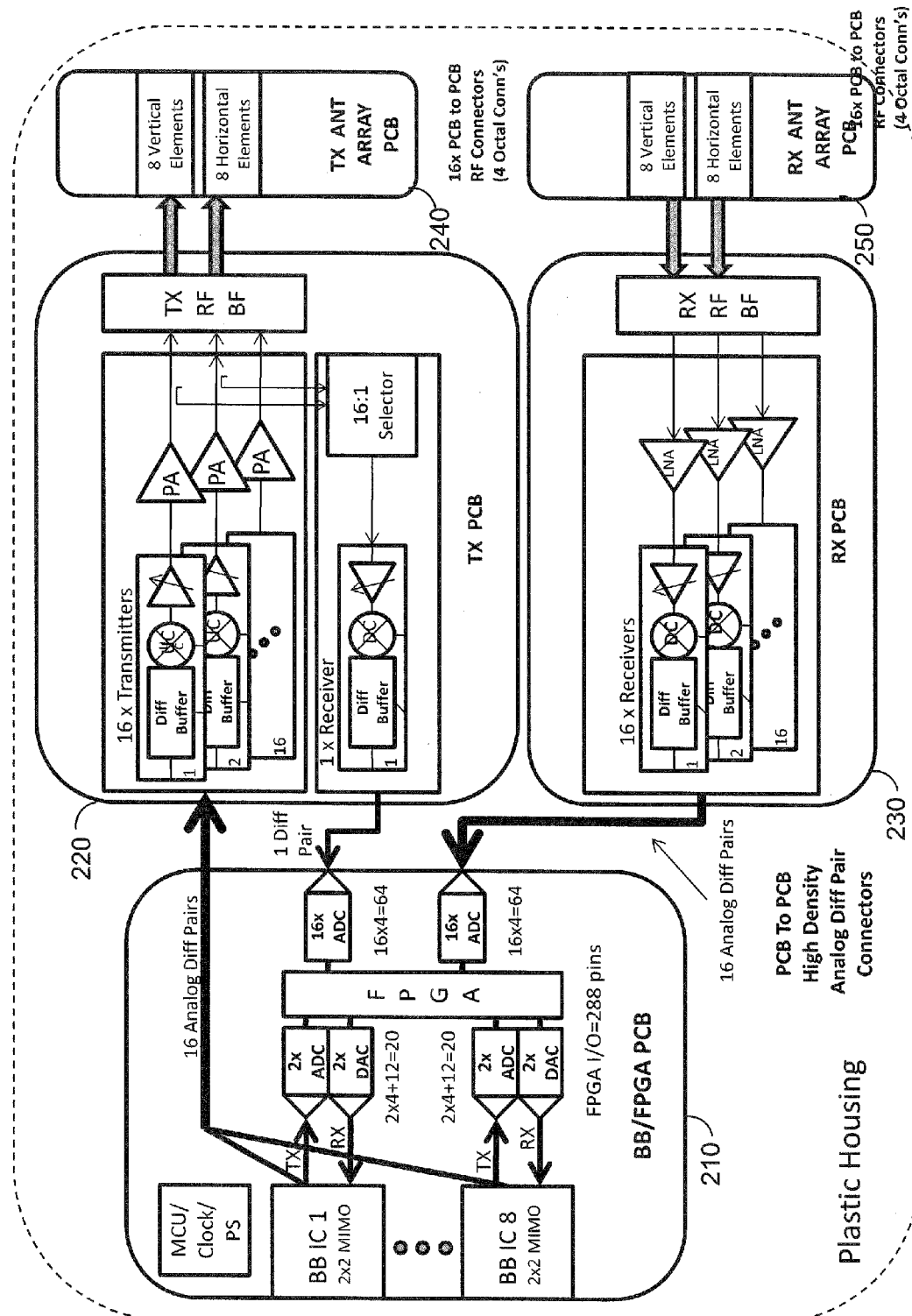
FIG. 2 is a block diagram illustrating an analog radio frequency (RF) beamformer with digital cancellation in accordance with some embodiments of the present invention.

FIG. 2 shows a diagram of another exemplary non-limiting analog beamformer with digital cancellation according to one embodiment. The system according to one embodiment may include five functional modules, each for example on its own Printed Circuit Board (PCB). The modules may include: baseband Field Programmable Gated Array (FPGA) PCB 210, transmit PCB 220, transmit antenna array PCB 240, receive PCB 230, and receive antenna array PCB 250. The baseband FPGA PCB 210 performs the functions of master controller, access point baseband, digital beam forming and cancellation in the FPGA. The transmit PCB 220 performs the functions of up conversion to RF, power amplification and sampling of the amplified RF signal. The receive PCB 230 performs the functions of RF low noise amplification, and down conversion to baseband analog. The transmit antenna array PCB 240 performs the function of transmit antenna array elements to create the transmit beams. The receive antenna array PCB performs the function of receive antenna array elements to create the receive beams.

The transmit operation and signal flow is according to one embodiment as follows. Each of 8 access point baseband chips (BB IC1 to BB IC8) generates 2 baseband analog differential pairs for up conversion to RF. These signals are passed to the analog to digital converters for conversion to serial digital signals. This digital signal is then passed to the FPGA so they can be used for cancellation of residual transmit signal that occurs in the receive path due to limited transmit to RX antenna isolation. The baseband analog signals are also passed to the transmit PCB using differential buffers and differential pair connectors. In the transmit PCB 220 they are up-converted to RF and amplified. The RF signal at the output of the power amplifier is then sampled using a coupler and for example 16:1 RF selector switch. That sampled signal is then down converted in the transmit PCB and passed as an analog diff pair to the baseband/FPGA PCB 210 for use in the cancellation process. The main RF signals at the output of the power amps are passed to the transmit RF Beamformer (TX RF BF) which creates the necessary analog signal processing for the radiated beams. These transmit signals are then passed to the transmit antenna array PCB using for example 16 coax connections. Within the transmit antenna array PCB the signals are routed to the appropriate antenna element to create the TX beam.

The Receive operation and signal flow is according to one embodiment as follows. RF signals are received at antenna elements of the receive antenna array PCB. They are passed to the receive RF beamformer (RX RF BF) in the receive PCB 230 using 16 coax connections. The RX RF BF creates the necessary analog signal processing for the receive beams. The processed RF signals are then passed to the receiver chip for low noise amplification and down-conversion to analog baseband. These 16 analog differential pairs are then passed to the BB/FPGA PCB where they are converted to digital by Analog to Digital Converters (ADC). The digitized revive signals are then passed to the FPGA which uses signal processing to cancel the residual transmit signal due to limited transmit to receive antenna isolation by means of combining with the sampled digital transmit signals using an FIR filter. The "cleaned up" receive signals are then passed to digital to analog converters (DAC) to generate the analog baseband RX signal. This signal is then passed to its appropriate baseband chip (BB IC1 to BB IC8) for use by its access point.

Figure 3:
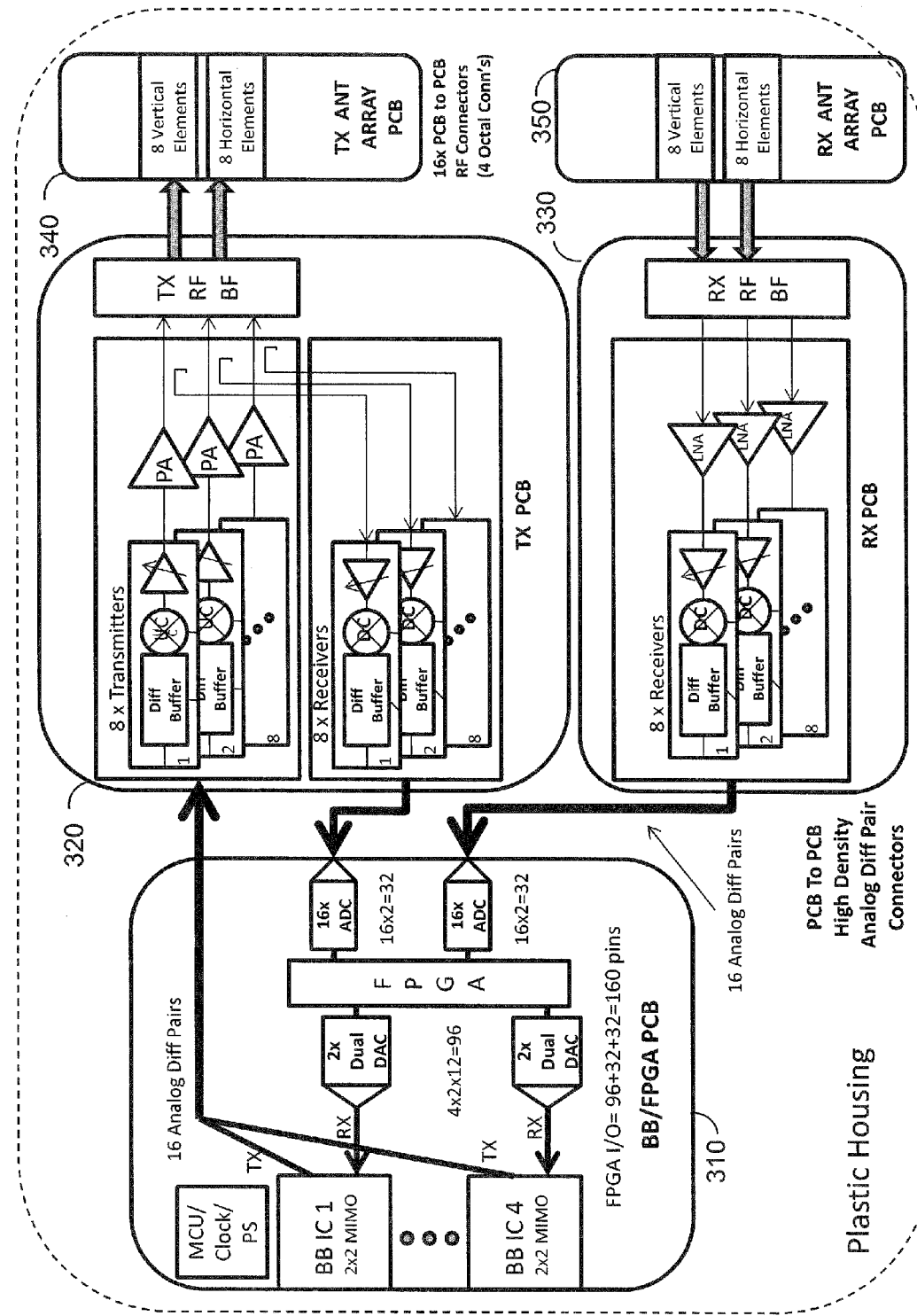
FIG. 3 is a block diagram illustrating an analog RF beamformer with digital cancellation in accordance with some embodiments of the present invention.

FIG. 3 shows a diagram of an alternate scheme for an analog beam former with digital cancellation according to one embodiment. It is similar in concept to the scheme of FIG. 2, but there are only for example four baseband chips, and each coupler at the power amp output has its own down converter instead of using a 16:1 selector switch. This allows the coupled transmit signal to be used directly by the FPGA to digitally cancel the transmit leakage from the receive signal path. The system may include for example five functional modules, each on its own Printed Circuit Board (PCB). The modules may include: baseband Field Programmable Gated Array (FPGA) PCB 310, transmit PCB 320, transmit antenna array PCB 340, receive PCB 330, and receive antenna array PCB 350. The BB/FPGA PCB performs the functions of master controller, access point baseband, analog to digital and digital to analog conversion, and cancellation of residual transmit signal in the RX path using an FPGA. The transmit PCB 320 performs the functions of up conversion to RF, power amplification and sampling of the amplified RF signal and analog RF beam forming. The receive PCB 330 performs the functions of analog RF RX beam forming, RF low noise amplification, and down conversion to baseband analog. The transmit antenna array PCB 340 performs the function of transmit antenna array elements to create the transmit beams. The receive antenna array PCB performs the function of receive antenna array 350 elements to create the receive beams.

The transmit operation and signal flow is as follows. Each of 4 access point baseband chips (BB IC1 to BB IC4) generates 2 baseband analog differential pairs for up conversion to RF. These signals are passed to transmit PCB transmit PCB using differential buffers and differential pair connectors. In the transmit PCB they are up-converted to RF and amplified. The RF signal at the output of each of the power amplifiers is then sampled using a coupler. That sampled signal is then down converted in the transmit PCB and passed as an analog diff pair to the BB/FPGA PCB for use in the cancellation process. The main RF signals at the output of the power amps are passed to the transmit RF Beam former (TX RF BF) which creates the necessary analog signal processing for the radiated beams. These transmit signals are then passed to the transmit antenna array PCB using 16 coax connections. Within the transmit antenna array PCB the signals are routed to the appropriate antenna element to create the transmit beam.

The receive operation and signal flow according to one embodiment is as follows. RF signals are received at antenna elements of the receive antenna array PCB. They are passed to the receive RF beam former (RX RF BF) in the receive PCB using 16 coax connections. The RX RF BF creates the necessary analog signal processing for the receive beams. The processed RF signals are then passed to the receiver chip for low noise amplification and down-conversion to analog baseband. These 8 analog differential pairs are then passed to the baseband FPGA PCB where they are converted to digital by analog to digital converters (ADC). The digitized RX signals are then passed to the FPGA which uses signal processing to cancel the residual transmit signal due to limited transmit to RX antenna isolation by means of combining with the sampled digital transmit signals using an FIR filter. The "cleaned up" RX signals are then passed to digital to analog converters (DAC) to generate the analog baseband RX signal. This signal is then passed to its appropriate baseband chip (BB IC1 to BB IC4) for use by its access point.

Figure 4:
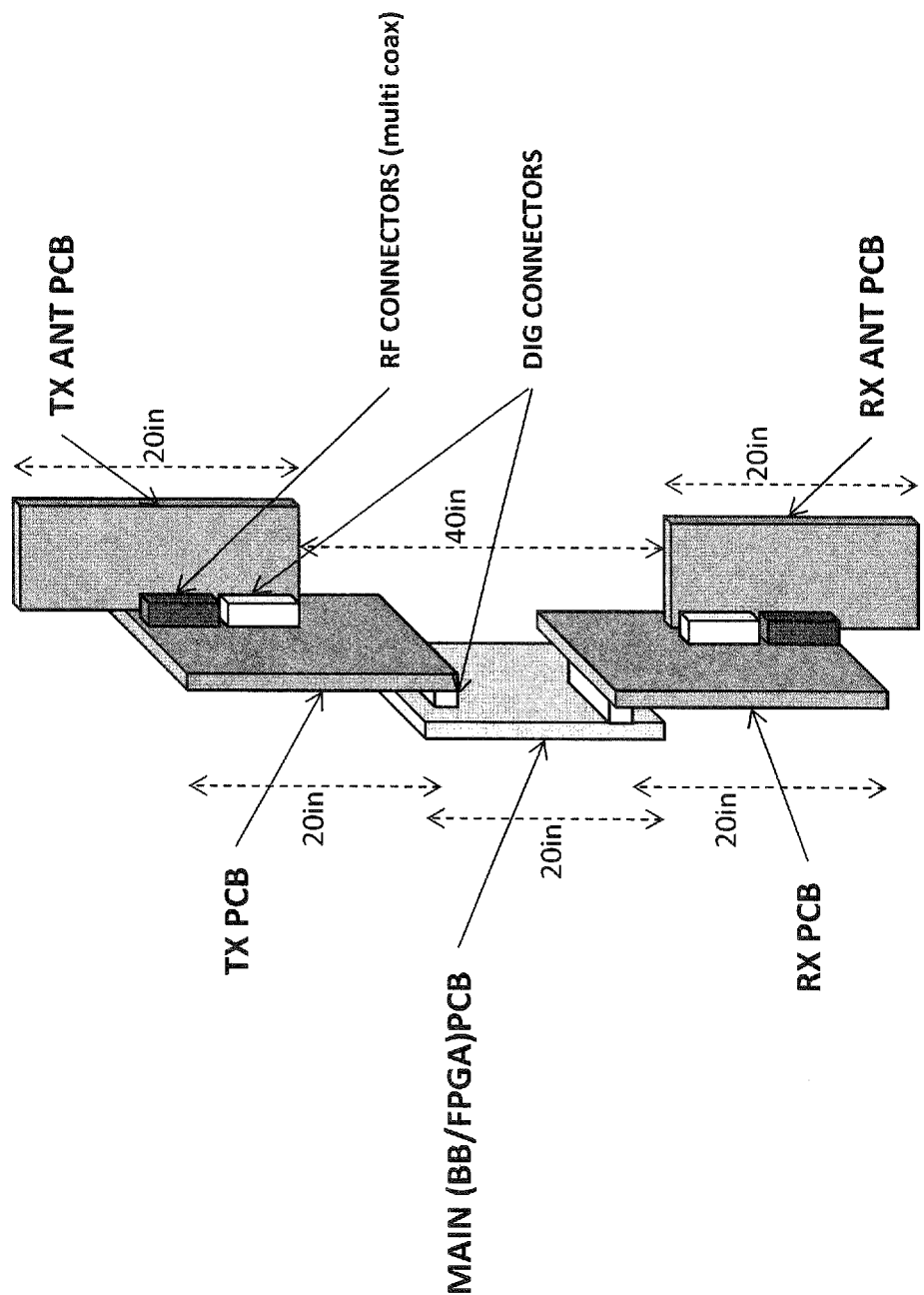
FIG. 4 is a block diagram illustrating a mechanical concept and interconnect of a multi-beam AP system in accordance with some embodiments of the present invention.

FIG. 4 shows a diagram of the mechanical concept according to one embodiment. This concept may apply for example to the block diagrams of FIGS. 1, 2, and 3. Each of the antenna array boards, transmit antennas array and receive antennas array may need to be fairly large (e.g. 20 inch long; other dimensions may be used) to create the antenna patterns. In addition, the two antenna arrays must according to one embodiment be spaced by as much as for example 40 inches to achieve reasonable transmitter to receiver isolation. Cables could then be used to interconnect all the PCBs, but the cost and unreliability of so many cable connections is prohibitive. A more innovative concept is to use the boards themselves to bridge the 40 inch gap between antenna arrays in a manner shown in the diagram. The interconnect between boards is then accomplished by high density board to board connectors which provide high reliability, good signal integrity, and lower cost than cables. As with other examples provided herein, other dimensions may be used.

Figure 5:
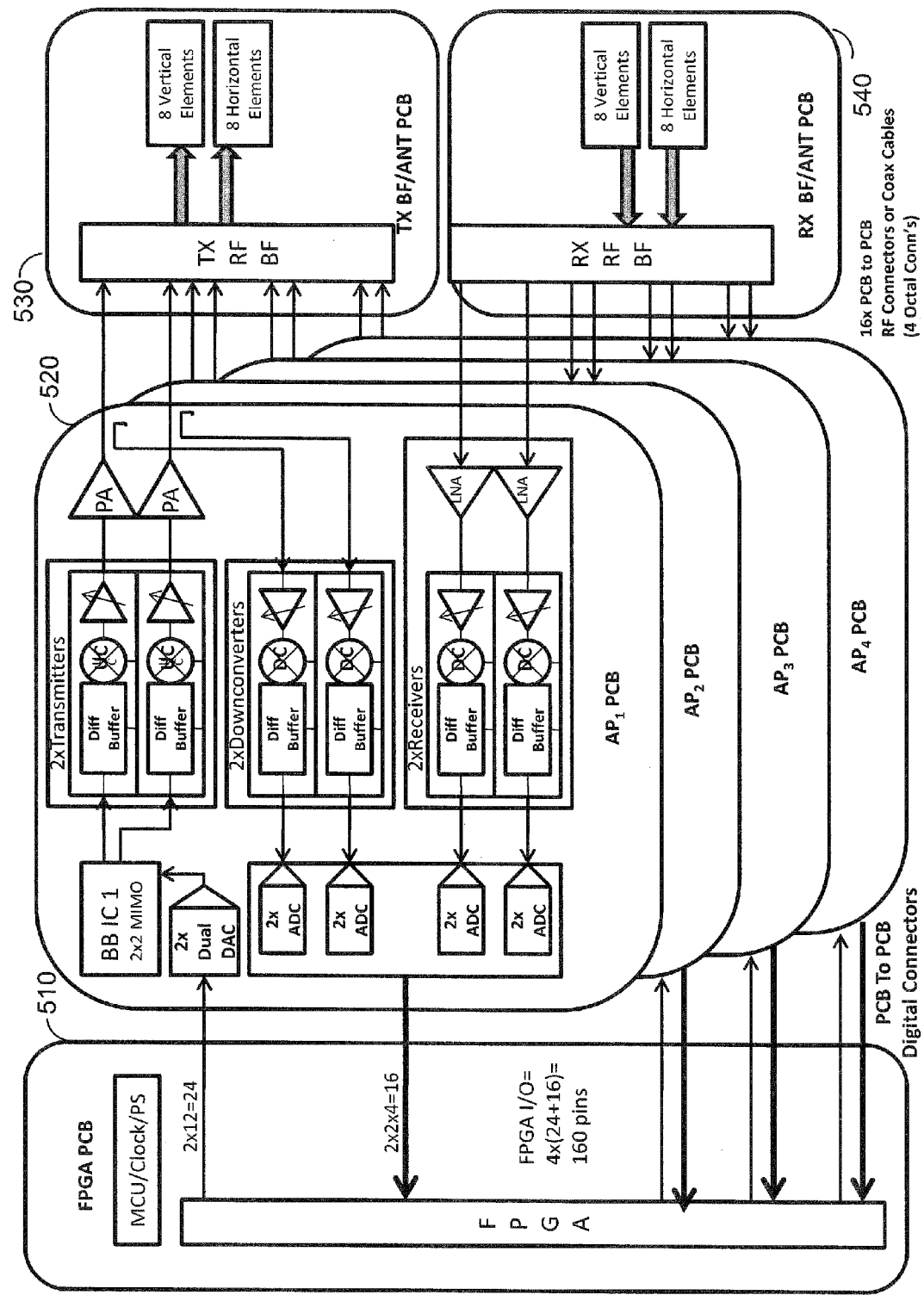
FIG. 5 is a block diagram illustrating an analog RF beamformer with digital cancellation in accordance with some embodiments of the present invention.

FIG. 5 shows a diagram of an alternate scheme for an analog beam former with digital cancellation according to one embodiment. It is identical in concept to the scheme of FIG. 3, but the physical partitioning of the components is different. Each Baseband IC along with its associated transceiver/PA/LNA/ADC/DAC components is grouped in its own shielded PCB module. This may allow for a reduction in the transceiver quantity because the up converter and down converter in each transceiver chip package are both utilized. The system may include four functional module types, each on its own printed circuit board (PCB). They are: FPGA PCB 510, AP(1-4) PCB 520, transmit beamformer/antenna PCB 530, and receive beamformer/antenna PCB 540. The FPGA PCB performs the functions of master controller, and digital signal processing for cancellation of residual transmit signal in the receive path using an FPGA. The transmit PCB may performs the functions of analog to digital and digital to analog conversion, up conversion to RF, power amplification and sampling of the amplified RF signal. The receive PCB performs the functions of RF low noise amplification, down conversion to baseband analog, and analog to digital conversion. The transmit antenna array PCB performs the function of analog RF beam forming, and transmit antenna array elements to create the transmit beams. The receive antenna array PCB performs the function of receive antenna array elements and analog RF beam forming to create the receive beams.

The transmit operation and signal flow is according to one embodiment as follows. Each of for example four access point baseband chips (BB IC1 to BB IC4) generates two baseband analog differential pairs for up conversion to RF. These signals are then passed to the transmitters, up-converted to RF, and amplified within the AP PCB. The RF signal at the output of the power amplifier is then sampled using a coupler. That sampled signal is then down converted and converted to digital in the AP PCB and passed to the FPGA PCB for use in the cancellation process. The main RF signals at the output of the power amps are passed to the transmit RF Beamformer (transmit RF BF) using coax cables. The TX RF BF creates the necessary analog signal processing for the radiated beams. These transmit signals are then passed to the for example 16 antenna elements.

The Receive operation and signal flow is as follows. RF signals are received at antenna elements of the receive beamformer/antenna PCB. They are passed to the receive RF beamformer (RX RF BF). The RX RF BF creates the necessary analog signal processing for the receive beams. The processed RF signals are then passed to the appropriate AP PCB for low noise amplification and down-conversion to baseband by the Receivers. The analog baseband signals from the receivers are converted to digital by analog to digital converters (ADC). The digitized receive signals are then passed to the FPGA PCB which uses signal processing to cancel the residual transmit signal due to limited transmit to receive antenna isolation by means of combining with the sampled digital transmit signals using an FIR filter. The "cleaned up" digital receive signals are then passed back to the appropriate AP PCB where digital to analog converters (DAC) are used to generate the analog baseband receive signal. This signal is then passed to its appropriate baseband chip (BB IC1 to BB IC4) for use by its access point.

Figure 6:
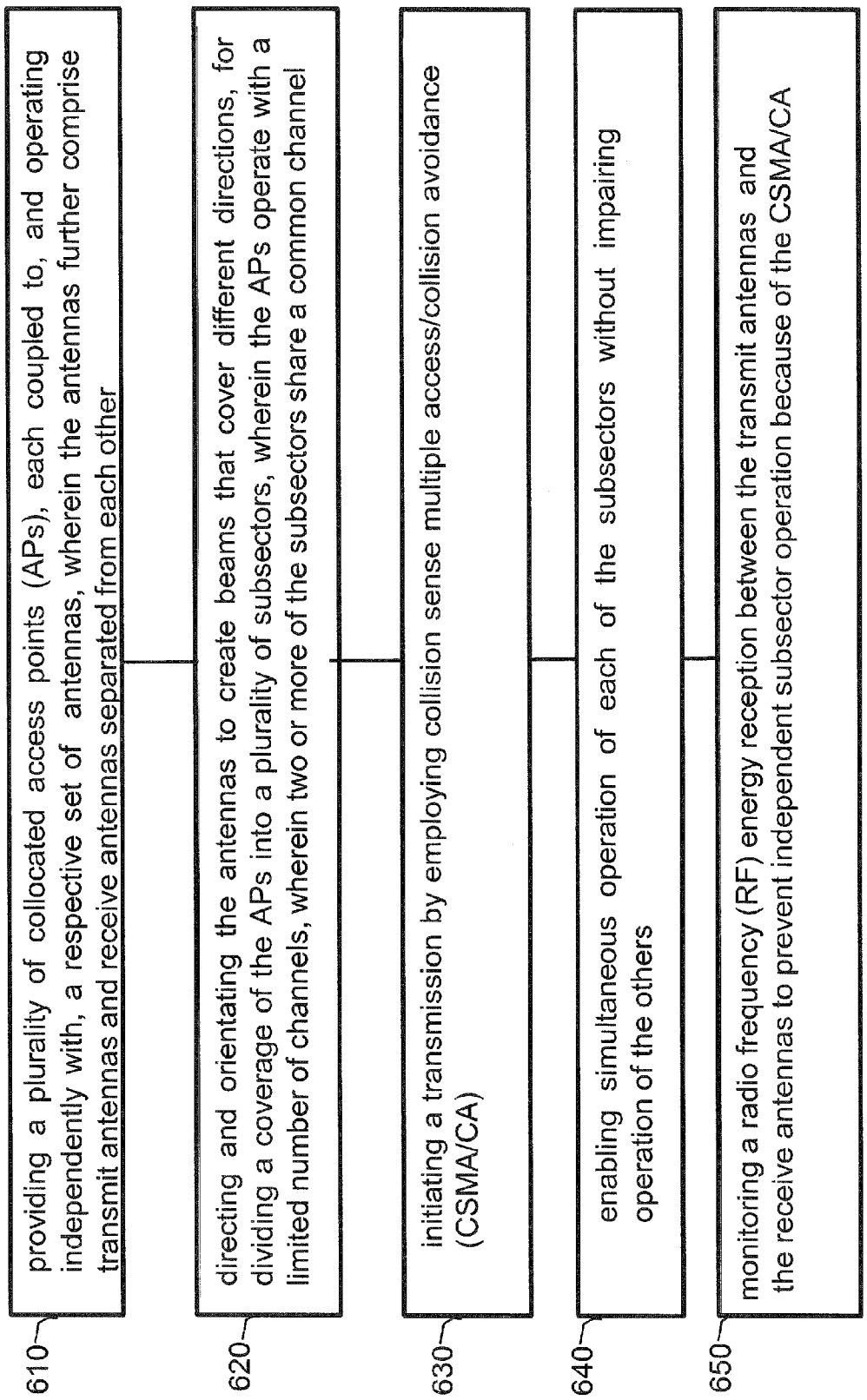
FIG. 6 is a high level flowchart illustrating a method according to some embodiments of the present invention.

FIG. 6 is a high level flowchart illustrating a method according to some embodiments of the present invention. Method 600 may include according to one embodiment providing a plurality of collocated access points (APs), each coupled to, and operating independently with, a respective set of antennas, wherein the antennas further comprise transmit antennas and receive antennas separated from each other 610; directing and orienting the antennas to create beams that cover different directions, for dividing a coverage of the APs into a plurality of subsectors, wherein the APs operate with a limited number of channels, wherein two or more of the subsectors share a common channel; 620 initiating a transmission by employing collision sense multiple access/collision avoidance (CSMA/CA) 630; enabling simultaneous operation of each of the subsectors without impairing operation of the others 640; and monitoring a radio frequency (RF) energy reception between the transmit antennas and the receive antennas to prevent independent subsector operation because of the CSMA/CA 650.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system".

Embodiments of the present invention may include apparatuses for performing the operations herein. Such apparatuses may be specially constructed for the desired purposes, or may comprise controllers, computers or processors selectively activated or reconfigured by a computer program stored in the computers. Such computer programs may be stored in a computer readable storage medium (e.g., a non-transitory computer readable storage medium), such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. It will be appreciated that a variety of programming languages may be used to implement the teachings of the invention as described herein.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

Embodiments of the present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a plurality of collocated access points (APs), each coupled to, and operating independently with, a respective set of antennas,
   wherein the antennas are directional and oriented to create beams that cover different directions, for dividing a coverage of the APs into a plurality of subsectors,
   wherein the antennas further comprise transmit antennas and receive antennas separated from each other,
   wherein the APs operate with a limited number of channels,
   wherein two or more of the subsectors share a common channel,
   wherein the APs are configured to initiate a transmission by employing collision sense multiple access/collision avoidance (CSMA/CA),
   wherein the antennas are configured to enable simultaneous operation of each of the subsectors without impairing operation of the others, and
   wherein a radio frequency (RF) energy reception between the transmit antennas and the receive antennas is configured to prevent independent subsector operation because of the CSMA/CA,
   further comprising a sampler configured to sample an RF signal being radiated by each antenna for each of the APs, and an analog to digital converter configured to convert the sampled RF signals into sampled digital signals,
   wherein the received RF energy is reduced by combining the received transmitted RF energy with the sampled digital signals, to allow simultaneous operation of the APs.

2. The system according to claim 1, wherein the limited number of channels comply with IEEE 802.11 standards.

3. The system according to claim 1, wherein the combining of signals is carried out by applying a finite impulse response (FIR) filter at a baseband processor of the APs.

4. The system according to claim 1, wherein the antennas are implemented as a multi-beam antenna array.

5. A method comprising:
providing a plurality of collocated access points (APs), each coupled to, and operating independently with, a respective set of antennas, wherein the antennas further comprise transmit antennas and receive antennas separated from each other;
directing and orienting the antennas to create beams that cover different directions, for dividing a coverage of the APs into a plurality of subsectors, wherein the APs operate with a limited number of channels, wherein two or more of the subsectors share a common channel;
initiating a transmission by employing collision sense multiple access/collision avoidance (CSMA/CA);
enabling simultaneous operation of each of the subsectors without impairing operation of the others; and
monitoring a radio frequency (RF) energy reception between the transmit antennas and the receive antennas to prevent independent subsector operation because of the CSMA/CA,
further comprising sampling an RF signal being radiated by each antenna for each of the APs,
converting the sampled RF signals into sampled digital signals,
combining the received RF energy with the sampled digital signals to allow simultaneous operation of the APs and to reduce the received RF energy.

6. The method according to claim 5, wherein the limited number of channels comply with IEEE 802.11 standards.

7. The method according to claim 5, wherein the combining of signals is carried out by applying a finite impulse response (FIR) filter.

8. The method according to claim 5, wherein the antennas are implemented as a multi-beam antenna array.

9. A non-transitory computer readable storage medium having computer readable instructions stored thereon, the instructions when executed by a processor causing the processor to:
direct and orientate a plurality of antennas to create beams that cover different directions, for dividing a coverage of the APs into a plurality of subsectors, wherein the APs operate with a limited number of channels, wherein two or more of the subsectors share a common channel;
initiate a transmission by employing collision sense multiple access/collision avoidance (CSMA/CA);
enable simultaneous operation of each of the subsectors without impairing operation of the others; and
monitor a radio frequency (RF) energy reception between the transmit antennas and the receive antennas to prevent independent subsector operation because of the CSMA/CA,
wherein the instructions cause the processor to sample an RF signal being radiated by each antenna for each of the APs and convert the sampled RF signals into digital signals, and
wherein the instructions cause the processor to combine the received RF energy with the sampled digital signals to allow simultaneous operation of the APs and to reduce the received transmitted RF energy.

10. The computer readable storage medium according to claim 9, wherein the limited number of channels comply with IEEE 802.11 standards.

11. The computer readable storage medium according to claim 9, wherein the combining of signals is carried out by applying a finite impulse response (FIR) filter.

* * * * *